Dec. 27, 1955  J. N. EDWARDS  2,728,866
ELECTRO-MECHANICAL VOLTAGE DIFFERENTIAL DETECTOR
Filed March 8, 1955
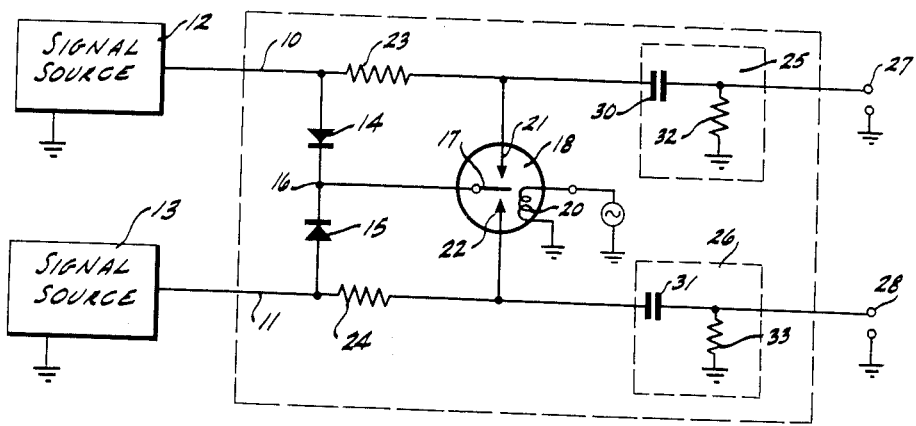
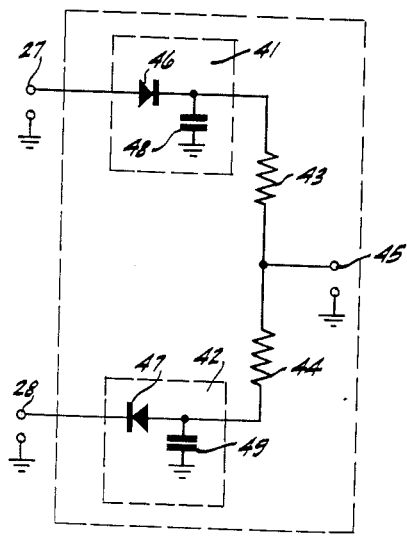
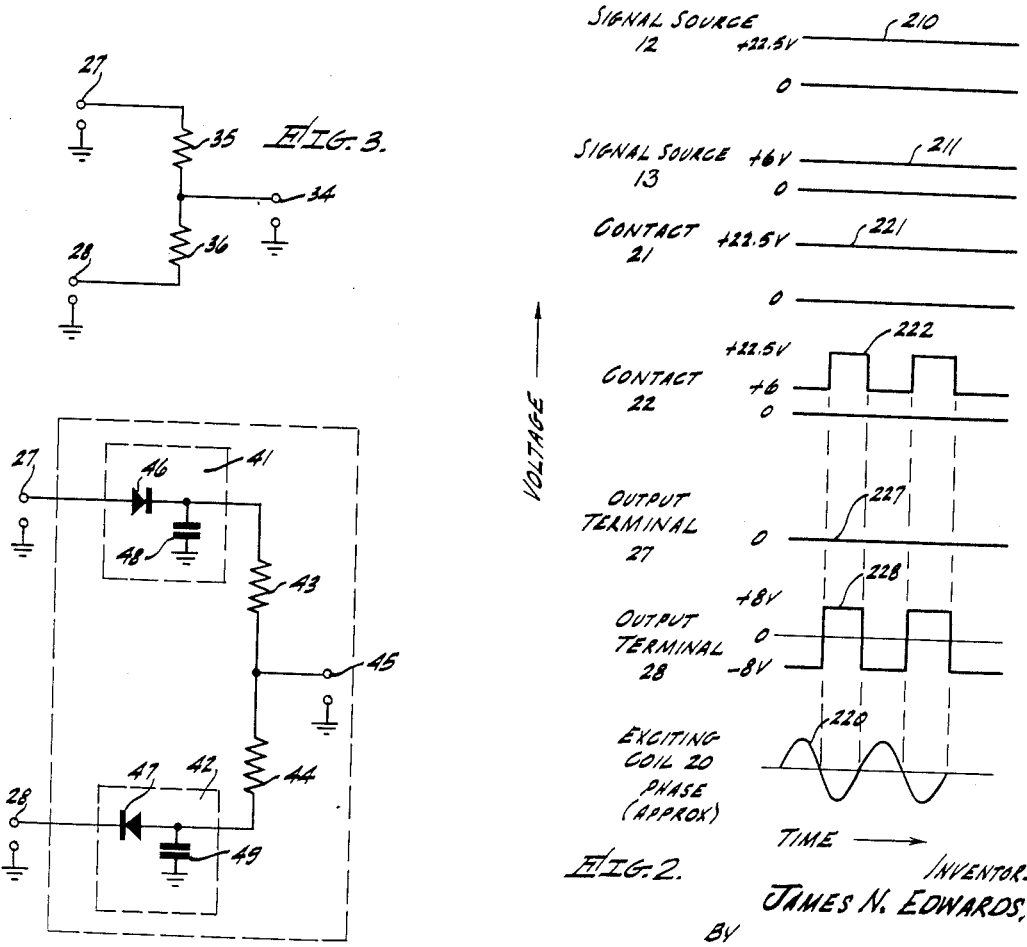
INVENTOR.
JAMES N. EDWARDS,
BY
Henry Heyman
ATTORNEY.

United States Patent Office 2,728,866
Patented Dec. 27, 1955

2,728,866

ELECTRO-MECHANICAL VOLTAGE DIFFERENTIAL DETECTOR

James N. Edwards, Inglewood, Calif., assignor to Hughes Aircraft Company, Culver City, Calif., a corporation of Delaware Application March 8, 1955, Serial No. 492,934

8 Claims. (Cl. 307—149)

The present invention relates to voltage differential detectors, and more particularly to an electro-mechanical detector for receiving two input signals and producing an output signal which is proportional to the instantaneous voltage differential between the two input signals.

Heretofore, there have been proposed a number of circuits for receiving two input signals and producing an output signal which is proportional to the voltage differential between the signals. Ordinarily, where such devices have included an electro-mechanical switch or chopper, it has been necessary to provide either a plurality of switch arms on a single chopper, or to include a plurality of choppers in the circuit, if the output information is to include an indication of the sense of the voltage differential. The use of choppers having a plurality of switch arms and contacts, or alternatively, the use of a plurality of single-pole choppers results in a circuit which is large and bulky, and requires critical adjustment.

It is an object of the present invention to provide an electro-mechanical voltage differential detector for receiving two input signals and producing an output signal which is proportional to the instantaneous voltage differential between the two input signals which includes a single electro-mechanical switch or chopper.

A further object of the present invention is to provide an electro-mechanical voltage differential detector for receiving as input signals positive direct-current, negative direct-current or alternating-current voltages, and producing an output signal on one of its two output terminals which is proportional to the instantaneous voltage differential between the two input signals.

Another object of the present invention is to provide a circuit of the class described having a pair of output terminals, the output signal appearing on one or another of the output terminals in accordance with the sense of the voltage differential between the two input signals.

Still a further object of the present invention is to provide an electro-mechanical voltage differential detector for producing an output signal on a single output terminal which is proportional to the instantaneous voltage differential between two input signals and bears a phase relationship to the phase of the electro-mechanical switch which is indicative of the sense of the voltage differential between the two input signals.

Yet another object of the present invention is to provide a detector of the type referred to for producing a direct-current output signal on a single output terminal which is proportional to the instantaneous voltage differential between the two input signals, and has a polarity indicative of the sense of the voltage differential.

According to the present invention, a voltage differential detector comprises first and second input terminals for receiving first and second input signals; an electro-mechanical switch having a single switch arm arranged to alternately contact first and second contact points; first and second diodes interconnecting said switch arm and said first and second input terminals, respectively; and first and second load devices interconnecting said first input terminal and said first contact point, and said second input terminal and said second contact point, respectively, whereby the signals appearing on said contact points are representative of the voltage differential between the input signals.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Fig. 1 is a circuit diagram of an embodiment of the electro-mechanical voltage differential detector of the present invention;

Fig. 2 is a diagram of wave forms of signals appearing in the circuit of Fig. 1 in operation; and Figs. 3 and 4 are circuit diagrams of embodiments of output circuits which may be connected to the output terminals of the circuit of Fig. 1, to provide a single terminal output.

As shown in Fig. 1, an electro-mechanical voltage differential detector, according to the present invention, comprises first and second input leads 10 and 11 for receiving applied input signals from signal sources 12 and 13. The signals from sources 12 and 13 may be positive D. C. voltages, negative D. C. voltages, or A. C. voltages, or any combination thereof. A first diode 14 and a second diode 15 having their cathodes connected to a common point 16, have their anodes connected to each of input leads 10 and 11 respectively. Common point 16 in turn is connected to the switch arm 17 of a single-pole double-throw electro-mechanical switch 18, whose driving coil 20 is energized by alternating current as indicated having a suitable amplitude and frequency.

Switch arm 17 is arranged to alternately contact fixed contact points 21 and 22, respectively, as the arm vibrates in synchronism with the current in coil 20. Fixed contact 21 is connected to input lead 10 and the anode of diode 14 through a load resistor 23, while fixed contact 22 is similarly connected to input lead 11 through a load resistor 24.

While contacts 21 and 22 may be regarded as output terminals of the circuit, as will be better understood from the description of operation of the circuit hereinafter set forth, components of the input signals, other than the desired differential output signal, appear at each of these points. Accordingly, a pair of coupling networks 25 and 26 is utilized to couple each of contacts 21 and 22 to first and second output terminals 27 and 28, respectively. Each of coupling networks 25 and 26 includes a capacitor 30 or 31 connected between contact 21 and output terminal 27, and between contact 22 and output terminal 28 for blocking direct current, and a resistor 32 or 33 connected between each output terminal and ground, across which the differential output signal is developed.

Referring now to Fig. 2, there is shown a diagram of waveforms of signals appearing in the circuit of Fig. 1 in operation, the amplitude of each signal being indicated as the ordinate, while time is depicted as the abscissa. Each waveform has a number corresponding to the reference number of the point at which the signal appears in the circuit of Fig. 1 preceded by the numeral 2. For purposes of illustration, it will be assumed that the signal voltage applied to input lead 10 from source 12 is a D. C. voltage 22½ volts positive with respect to ground, and numbered 210, and that the signal applied to input lead 11 from source 13 is a D. C. voltage, 6 volts positive with respect to ground and numbered 211.

Considering now the response of the circuit of Fig. 1 to input signals 210 and 211, and the energizing of driving coil 20, when arm 17 engages contact 21, signal 210 will appear at contact 21 since diode 14 is effectively biased in a forward or conducting direction, while diode 15 is biased in a reverse or non-conducting direction. Contact 21 will accordingly assume a potential of 22½ volts, the signal waveshape being shown as waveshape 221. At the same time contact 22 will assume a potential corresponding to that of input lead 11, or 6 volts positive, as shown in waveshape 222.

When arm 17 moves from contact 21 to contact 22, contact 22 will immediately rise to a potential of 22½ volts, since diode 14 is still biased in a forward or conducting direction, while diode 15 is again biased in a reverse or non-conducting direction. Load resistor 24 is included in the circuit to prevent the flow of excessive current between the two input signal sources. Contact 21 will at the same time remain at substantially 22½ volts. When arm 17 again moves from contact 22 to contact 21, contact 22 will again fall to a potential of 6 volts. It will thus be seen that a peak-to-peak voltage variation is produced at contact 22 which is approximately equal to, or at least proportional to, the difference of potential between source 12 and source 13. Since this voltage signal is alternating current modulated at the frequency of the current driving energizing coil 20, a similar signal corresponding to the alternating current component of signal 222 will be coupled to output terminal 28 by capacitor 31, and appear thereon. This signal, shown as waveshape 228, will have an amplitude between approximately +8 volts and −8 volts proportional to the difference of potential between input signals 210 and 211. It should be noted that contact 21 will undergo a substantially zero voltage potential variation under the conditions described and accordingly no signal will be presented at output terminal 27, as shown by waveshape 227.

As will be readily understood by analogy to the previous description, an output signal will appear at output terminal 27, instead of at output terminal 28 if the potential applied to input lead 11 is greater than that applied to lead 10. Under such conditions of operation, load resistor 23 will function to prevent the flow of excessive current between the two input signal sources. It will be understood, therefore, that the appearance of an output signal at one or the other of output terminals 27 and 28 is an indication of the sense of the difference of potential between the applied input signals. In either case, the amplitude of the output signal appearing on output terminal 27 and 28 will be proportional to the difference of potential between the two input signals.

An obvious modification of the circuit of Fig. 1 would be to reverse the direction of conduction of diodes 14 and 15, that is, connect the diodes with their anodes connected to common point 16, while their cathodes are connected to input terminals 10 and 11, respectively. Such a reversal will merely result in an interchange of the conditions of relative magnitude between input signals which cause output signals to be produced on output terminals 27 and 28.

One other waveform appears in Fig. 2, that of the exciting coil frequency, depicted as sine wave 220. As will be understood from the previous description and a consideration of Fig. 2, the voltage signals appearing at contacts 21 and 22 and at output terminals 27 and 28 are functions of the phase of the alternating current signal used to drive exciting coil 20 and arm 17, and more particularly, the signals appearing at terminals 27 and 28 are 180° out of phase with respect to each other. Thus, the signals appearing at terminals 27 and 28 contain both phase and amplitude information. Accordingly, a simple mixing circuit, such as that shown in Fig. 3 may be utilized in conjunction with the circuit of Fig. 1 to provide a single pair of output terminals 34 upon which a signal having a phase and amplitude representative of a voltage differential between input signals 12 and 13 appears. The mixing circuit of Fig. 3 comprises a pair of resistors 35 and 36, each having an end connected to one of terminals 27 and 28, while the other end of each resistor is connected to output terminal 34.

In operation, an output signal appearing on either of terminals 27 or 28 will be coupled to output terminal 34. This output signal will again be proportional to the voltage differential between input signals 12 and 13, while the phase relationship of the output signal to the exciting coil driving frequency will be indicative of the sense of the difference between the applied input signals. An appropriately designed phase detector, such as those well known in the art, may be used, for example, to recover the phase information present in the signal appearing on terminal 34, where it is desired to provide a single terminal D. C. output. Where only an indication of the magnitude of the voltage differential is desired, the output may be taken directly from terminal 34.

Alternatively, where a single terminal output indicative of the differential between two applied input signals is desired without the use of phase or similar type detectors in conjunction with the circuit of the present invention, the output mixing circuit shown in Fig. 4 may be utilized. The output circuit of Fig. 4 comprises a pair of opposite polarity peak detectors 41 and 42 for receiving input signals from output terminals 27 and 28, and a pair of resistors 43 and 44 each having an end connected to an output terminal of detectors 41 and 42, and their opposite end connected to output terminal 45, output terminal 45 serving as the output terminal for the circuit. Each of peak detectors 41 and 42 comprises a diode 46 and 47, respectively, connected between ouput terminal 27 and resistor 43, and between ouput terminal 28 and resistor 44, and a capacitor 48 and 49, respectively connected between a junction point of diode 46 and resistor 43, and diode 47 and resistor 44, and ground. Diodes 46 and 47 are arranged with their directions of high conductance opposite to each other, and accordingly for the same applied alternating current input signal, the output signal produced by each diode detector will be of opposite polarity. Since the signals supplied from terminals 27 and 28 are alternating current signals and appear on one or the other of the output terminals, a D. C. signal will appear on the diode detector output corresponding to the diode detector receiving an applied input signal. These signals are then mixed by resistors 43 and 44 in a manner similar to the mixing action of the embodiment of Fig. 3, and appear on output terminal 45. The polarity of the signal appearing on output terminal 45 will thus be seen to be a unique indication of which of detectors 41 and 42 is receiving an input signal, and correspondingly a unique indication of which of terminals 27 and 28 is supplied such a signal. Accordingly, the polarity of the signals appearing on terminal 45 is a unique indication of the sense of the voltage differential between the input signals applied to terminals 10 and 11. Since the output signal of each detector is proportional to the amplitude of its applied input signal, the amplitude of the signal appearing on terminal 45 will similarly be an indication of the absolute magnitude of the voltage differential of the signals applied to input terminals 10 and 11.

While load devices 23 and 24 have been depicted as resistors in Fig. 1, it should be understood that any other type of load device adapted for inhibiting the flow of current between the signal sources may be utilized. For example, where it is desired that the voltage differential detector of the present invention be utilized with D. C. input signals and have an essentially low internal impedance, a diode or similar unilaterally conductive device may be substituted for each of resistors 23 and 24. In substituting such diodes in the circuit of Fig. 1 the diodes would be connected with their directions of high conductance in accordance with the polarity of the applied input signals to provide circuit operation essentially similar to that previously described.

What is claimed is:

1. An electro-mechanical voltage differential detector for producing output signals corresponding to the voltage differential between two applied input signals, comprising: first and second input terminals for receiving first and second input signals; a first diode connected between said first input terminal and a common point; a second diode connected between said second input terminal and said common point; first and second output terminals; a single-pole double-throw electro-mechanical switch for alternately connecting said common point to said first and second output terminals; and first and second load devices interconnecting said first input terminal and said first output terminal, and said second input terminal and said second output terminal, respectively, whereby the output signals obtained from said output terminals are representative of the voltage differential between the input signals.

2. An electro-mechanical voltage differential detector for producing an output signal corresponding to the voltage differential between two applied input signals, comprising: first and second input terminals for receiving first and second input signals; an electro-mechanical switch having a single switch arm arranged to alternately contact first and second contact points; first and second diodes interconnecting said switch arm and said first and second input terminals, respectively; and first and second load resistors interconnecting said first input terminal and said first contact-point, and said second input terminal and said second contact point, respectively.

3. An electro-mechanical voltage differential detector for receiving first and second input signals and producing an output signal corresponding to the voltage differential between the input signals on one of two output terminals, said detector comprising: first and second input terminals for receiving first and second input signals; an electro-mechanical switch having a switch arm and first and second contact points, said switch arm being operable for alternately contacting said first and second contact points; first and second diodes interconnecting said first and second input terminals and said switch arm, respectively; first and second load resistors interconnecting said first input terminal and said first contact point, and said second input terminal and said second contact point, respectively; first and second output terminals; and first and second means for interconnecting said first contact point and said first output terminal, and said second contact point and said second output terminal, respectively.

4. The electro-mechanical voltage differential detector defined in claim 3, wherein said first and second means each comprises a network for passing alternating currents and blocking direct current.

5. The electro-mechanical voltage differential detector defined in claim 4, including a mixing network for coupling said first and second output terminals to a third output terminal, said mixing network comprising a pair of resistors for interconnecting said first and third output terminals, and said second and third output terminals, respectively.

6. The electro-mechanical voltage differential detector defined in claim 4, including a mixing network for coupling said first and second output terminals to a third output terminal, said mixing network comprising first and second alternating-current detectors coupled between said first and third output terminals, and said second and third output terminals, respectively.

7. An electro-mechanical voltage differential detector for receiving first and second input signals and producing an output signal corresponding to the voltage differential between the input signals on one of two output terminals, said detector comprising: first and second input terminals for receiving first and second input signals; an electro-mechanical switch having a switch arm operable for alternately contacting first and second contact points; first and second diodes interconnecting said switch arm and said first and second input terminals, respectively; first and second load resistors interconnecting said first input terminal and said first contact point, and said second input terminal and said second contact point, respectively; first and second output terminals; first and second alternating current coupling networks for interconnecting said first output terminal and said first contact point, and said second output terminal and said second contact point, respectively; and means responsive to an alternating current signal for operating the switch arm of said electro-mechanical switch, whereby an output signal is produced on one of said first and second output terminals in accordance with the sense of the voltage differential of the signals received on said first and second input terminals.

8. An electro-mechanical voltage differential detector for producing an output signal corresponding to the voltage differential between two applied input signals, comprising: first and second input terminals for receiving first and second input signals; a first diode connected between said first input terminal and a common point; a second diode connected between said second input terminal and said common point; first and second alternating-current detectors, said detectors being responsive to the same alternating-current input signal for producing direct current output signals of opposite polarity; a single-pole double-throw electro-mechanical switch for alternately connecting said common point to the inputs of said first and second detectors; first and second load resistors interconnecting said first input terminal and said first detector input and said second input terminal and said second detector input, respectively; and means for mixing the signals appearing on the outputs of said first and second detectors.

No references cited.